United States Patent
Cartoni et al.

(10) Patent No.: US 11,002,404 B2
(45) Date of Patent: May 11, 2021

(54) SYSTEM FOR SUPPORTING A SHOOTING CAMERA

(71) Applicant: CARTONI S.P.A., Rome (IT)

(72) Inventors: Maria Elisabetta Cartoni, Rome (IT); Alessandro Fiore, Rome (IT); Domenico Macchia, Rome (IT)

(73) Assignee: CARTONI S.P.A., Rome (IT)

(*) Notice: Subject to any disclaimer, the term of this patent is extended or adjusted under 35 U.S.C. 154(b) by 6 days.

(21) Appl. No.: 16/484,103

(22) PCT Filed: Feb. 7, 2018

(86) PCT No.: PCT/IT2018/050015
§ 371 (c)(1),
(2) Date: Aug. 6, 2019

(87) PCT Pub. No.: WO2018/146708
PCT Pub. Date: Aug. 16, 2018

(65) Prior Publication Data
US 2020/0026162 A1    Jan. 23, 2020

(30) Foreign Application Priority Data
Feb. 8, 2017   (IT) .......................... 102017000013381

(51) Int. Cl.
*F16M 11/10*    (2006.01)
*F16M 11/04*    (2006.01)
(Continued)

(52) U.S. Cl.
CPC ......... *F16M 11/105* (2013.01); *F16M 11/048* (2013.01); *F16M 11/18* (2013.01); *F16M 11/2057* (2013.01); *G03B 17/561* (2013.01)

(58) Field of Classification Search
CPC .... F16M 11/048; F16M 11/105; F16M 11/18; F16M 11/2057
See application file for complete search history.

(56) References Cited

U.S. PATENT DOCUMENTS 8,087,315 B2 * 1/2012 Goossen .............. F16M 11/041
                                                        74/5.22
9,277,130 B2 * 3/2016 Wang ................. H04N 5/23299
(Continued)

FOREIGN PATENT DOCUMENTS

CN         103672338 B    7/2015
EP         2759480 A1     7/2014

OTHER PUBLICATIONS

International Search Report and Written Opinion of the International Searching Authority for International Application No. PCT/IT2018/050015, dated Apr. 6, 2018, in 10 pages.
(Continued)

*Primary Examiner* — Eret C McNichols
(74) *Attorney, Agent, or Firm* — Knobbe, Martens, Olson & Bear, LLP

(57) ABSTRACT

Described is a system for supporting a camera, said camera being fixed on an articulated head which allows the homogeneous movement along axes $Z_{pan}$ and $Y_{tilt}$, said articulated head being equipped with variable fluid dampening means and counterbalancing means, for annulling the weight of the camera when rotated about the $Y_{tilt}$ axis, aid system being equipped with a structure for the rotation of the camera about a third $X_{roll}$ axis, said structure being interposed between said head, above the same, and said camera, below the same.

6 Claims, 7 Drawing Sheets

(51) Int. Cl.
*F16M 11/18* (2006.01)
*F16M 11/20* (2006.01)
*G03B 17/56* (2021.01)

(56) References Cited

U.S. PATENT DOCUMENTS

| | | | |
|---|---|---|---|
| 9,874,308 B2 * | 1/2018 | Saika | H04N 7/183 |
| 10,506,334 B1 * | 12/2019 | Shukla | H02K 7/003 |
| 2004/0173726 A1 * | 9/2004 | Mercadal | F16M 11/12 |
| | | | 248/660 |
| 2005/0196163 A1 * | 9/2005 | Mootz | F16M 11/041 |
| | | | 396/428 |
| 2006/0053912 A1 * | 3/2006 | Miller | F16M 13/02 |
| | | | 74/5.2 |
| 2009/0179127 A1 * | 7/2009 | Pettey | F16M 11/18 |
| | | | 248/276.1 |
| 2010/0079101 A1 * | 4/2010 | Sidman | F16M 11/041 |
| | | | 318/649 |
| 2010/0092165 A1 * | 4/2010 | Cartoni | F16M 11/10 |
| | | | 396/428 |
| 2014/0037278 A1 * | 2/2014 | Wang | H04N 5/2328 |
| | | | 396/55 |
| 2015/0285429 A1 * | 10/2015 | Le | F16M 13/00 |
| | | | 248/178.1 |
| 2016/0201847 A1 * | 7/2016 | Firchau | F16M 11/24 |
| | | | 224/567 |
| 2017/0099416 A1 * | 4/2017 | Pan | F16M 11/18 |
| 2019/0302578 A1 * | 10/2019 | Zhao | F16M 11/18 |
| 2019/0368654 A1 * | 12/2019 | Thomas | F16M 13/04 |
| 2020/0293046 A1 * | 9/2020 | Liu | F16M 11/2092 |

OTHER PUBLICATIONS

Search Report and Written Opinion issued in Italian Application No. 201700013381, dated Oct. 24, 2017, in 7 pages.

* cited by examiner

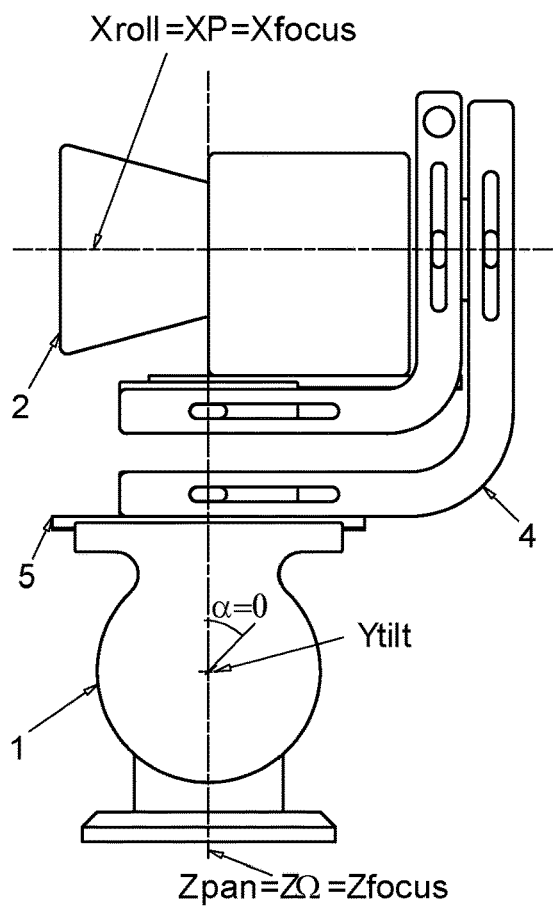
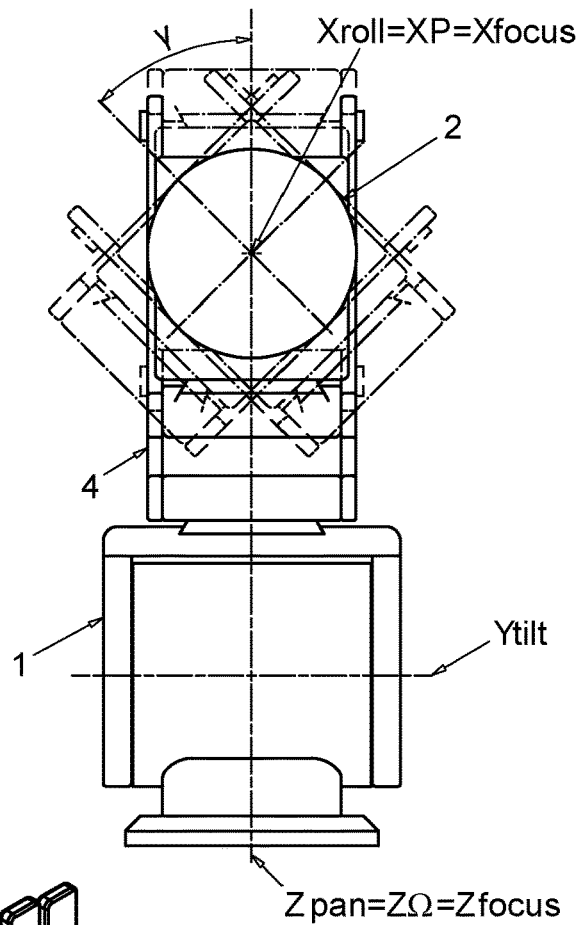
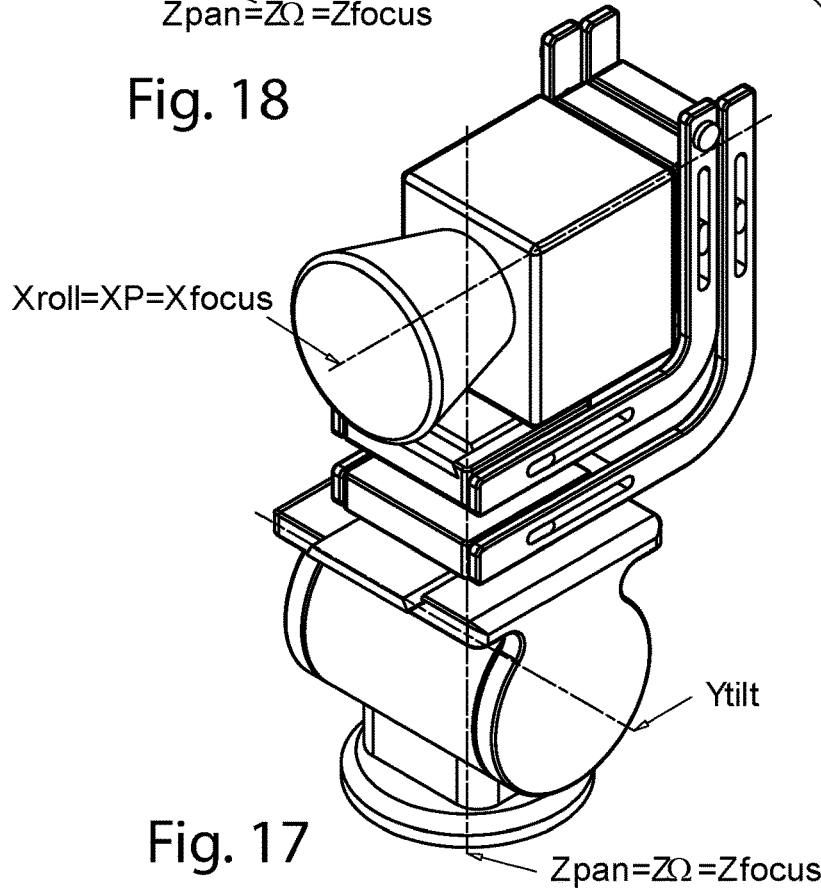
Fig. 18
Fig. 19
Fig. 17

SYSTEM FOR SUPPORTING A SHOOTING CAMERA

CROSS-REFERENCE TO RELATED APPLICATIONS

This application is the U.S. National Phase under 35 U.S.C. § 371 of International Application PCT/IT2018/050015, filed Feb. 7, 2018, which claims priority to IT Application No. 102017000013381, filed Feb. 8, 2017, the entire contents of each of which are incorporated by reference herein and made a part of this specification.

SUMMARY

This invention relates to a system for supporting a shooting camera.

More in detail, the invention relates to a system of the said type which allows a rotation about a third axis of the camera, also allowing a nodal shooting about said axis.

As is known, a standard shooting configuration consists in the use of a camera fixed on an articulated head which allows homogeneous movement with rotation about the Zpan and Ytilt axes.

This type of solution is shown schematically in FIGS. 1-3, which illustrate the prior art solutions.

Reference numeral 1 indicates the articulated head, reference numeral 2 indicates the camera to be supported on the head 2 and reference numeral 3 indicates the coupling plate of the camera.

Said articulated head 1 traditionally comprises variable fluid dampening means, and counterbalancing means, designed to annul the weight of the camera 2, when it is rotated about the Ytilt axis. More specifically, said head 1 allows complete 360° rotations β about the Zpan axis and rotations α less than ±90° about the Ytilt axis.

The need exists in the sector of being able to take shots adding a rotation about a third rotation of the camera 2, that is to say, the axis Xroll (not shown in FIGS. 1-3). Said lateral movement is commonly known as the "Dutch angle".

For this purpose, there are systems on the market (see FIGS. 4-6 and 7-9) which allow an element to be interposed between the head 1 and the camera 2 such as to satisfy this need.

A first system, illustrated in FIGS. 4-6, comprises the insertion of an element 4 equipped with fluid dampening and counterbalancing (similar to that which guarantees the balancing of the camera under rotations by an angle α about the Ytilt axis of a generic fluid head) which allows rotations γ to be carried out about a fixed axis Xroll which corresponds to the centre of rotation of the counterbalancing system.

A typical defect of this type of solution, illustrated in FIGS. 4-6, consists in the fact that, due to typical dimensional constraints, it allows rotations γ up to a maximum of ±90° about the Xroll axis. Moreover, it is not possible in any case to carry out a nodal shooting (wherein the optical centre coincides with the geometrical centre of rotation Xfocus=Xroll) about the Xroll axis.

More specifically, the rotation results in a radius of rotation RF of the image equal to the distance between Xroll and the focal centre of the camera Xfocus, which produces a visual sensation of revolution of the image about a point.

A further system (see in particular FIGS. 7-9), for moving laterally the camera 2 installed on the head 1 comprises the insertion between the camera 2 and the head 1 of a device which allows the rotation mechanically (for example, rack and worm screw). This system may allow the rotation γ about a fixed axis Xroll close to the focal axis of the camera Xfocus but not necessarily coinciding with it.

This system has the advantage, with respect to the system described above with reference to FIGS. 4-6, to significantly lower the centre of gravity of the system. However, the absence of a counterbalancing device means it is not possible to take moving shots without the use of a source of mechanical energy to contrast the potential energy of the weight of the camera 2, whilst it is possible to take static shots by locking the angular position of the device for predetermined angles γ about the Xroll axis.

Moreover, the range of variation of the lateral angle of rotation is, in this solution, even more limited (approx. ±15°).

Lastly, also in this case it is not always possible to take a nodal shot about the Xroll axis, with the exception of the case in which the centre of rotation of the system $X_{roll}$ coincides exactly with the focal centre of the camera $X_{focus}$.

More specifically, the rotation results in a radius of rotation RF of the image equal to the distance between Xroll and the focal centre of the camera Xfocus, which produces a visual sensation of revolution of the image about a point, that is to say, the Xroll axis.

This leads to the solution proposed according to this invention, which is able to overcome all the problems of the above-mentioned prior art systems, allowing the camera to be rotated by an angle γ of 360° about the $X_{roll}$ axis, without the use of any counterbalancing means, with the possibility of assisting the movement with fluid dampening or motorization. Moreover, the solution according to this invention guarantees the possibility of taking a nodal shot about the $X_{roll}$ axis, wherein the axis of rotation $X_{roll}$ coincides exactly with the $X_{focus}$ axis of the optical centre of the camera.

It is therefore a specific object of this invention a system for the supporting a camera, said camera being fixed on an articulated head permitting the smooth movement along Zpan and ytilt axes, said articulated head being provided with dampening variable fluid means and counterbalancing means, to annul the weight of the camera when rotated about the Ytilt axis, said system being provided with a structure for the rotation of the camera around a third $X_{roll}$ axis, said structure being interposed between said head, above the same, and said camera, below the same, and comprising, from the articulated head to the camera, fixing means to the articulated head, a first and a second profiled elements, hinged in correspondence of the $X_{roll}$ axis, so as to allow a complete 360° rotation γ of said second profile element with respect to said first profile element about the $X_{roll}$ axis, having at least a first arm substantially parallel with respect to a support plane of the system and a second arm substantially perpendicular with respect to said first arm, said first profiled element being coupled to said fixing means to the articulated head, said first and second profiled element being provided with means for the mutual adjustment and the camera along two planes parallel with respect to said first and second arm, a machine plate, coupled above said second profiled member, and supporting above said camera, the profiled element having an interface for coupling with the head, by said fixing means, and the profiled element having an interface allowing the fixing of the camera, by the plate.

Preferably, according to this invention, there are provided, on said second arm of said second profiled element, means for fixing counterbalancing weights.

Further according to the invention, said first and second profiled element are "L" shaped elements.

Always according to the invention, said fixing means between the head and the first profiled element are comprised of a plate.

Again according to the invention, said means for the mutual adjustment of the first and the second profiled element and the camera along two planes parallel with respect to said first and second arm of the respective first and second profiled element are linear guides, in particular slots, within which slide elements projecting from the respective plates.

The present invention is described, by way of example and without limiting the scope of the invention, with reference to the accompanying drawings which illustrate preferred embodiments of it, in which:

BRIEF DESCRIPTION OF THE DRAWINGS

FIG. 17 shows a perspective view of the system of FIG. 10 according to a third configuration;

FIG. 18 shows a schematic side view of the system of FIG. 17; and

FIG. 19 shows a front view of the system of FIG. 17.

FIGS. 10-19 shown an embodiment of the system according to the invention.

DETAILED DESCRIPTION

Figure 2:
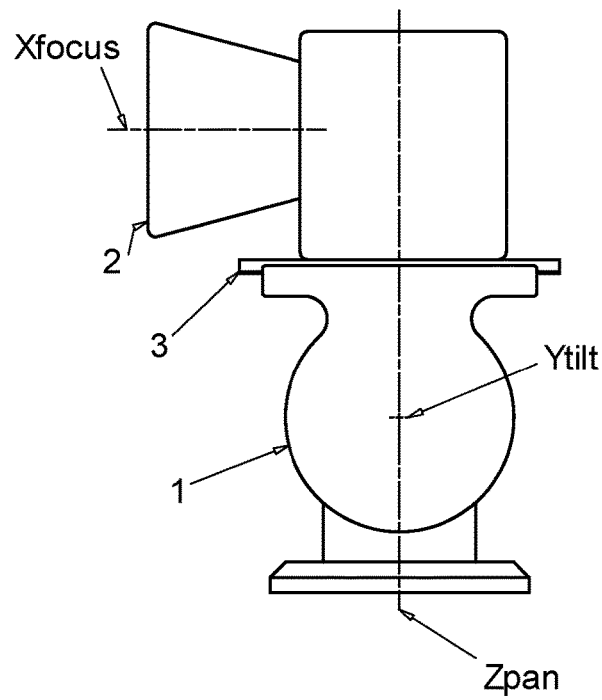
FIG. 2 shows a side view of the system of FIG. 1.
Figure 3:
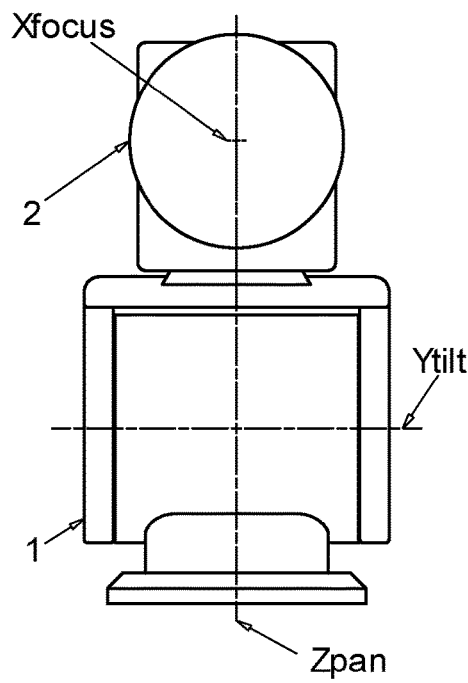
FIG. 3 shows a front view of the system of FIG. 1.
Figure 1:
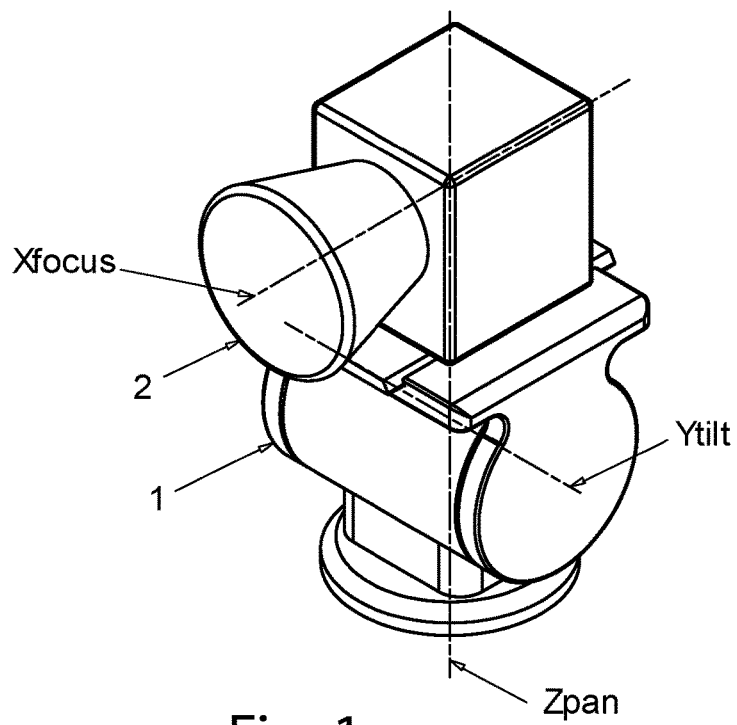
FIG. 1 schematically shows a perspective view of a system according to the prior art which does not allow the rotation of the camera about a third axis.
Figure 5:
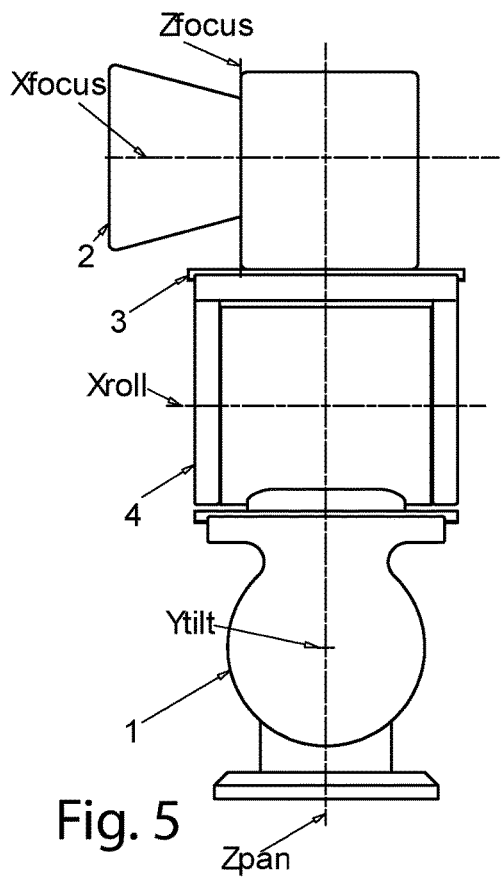
FIG. 5 shows a side view of the system of FIG. 4.
Figure 6:
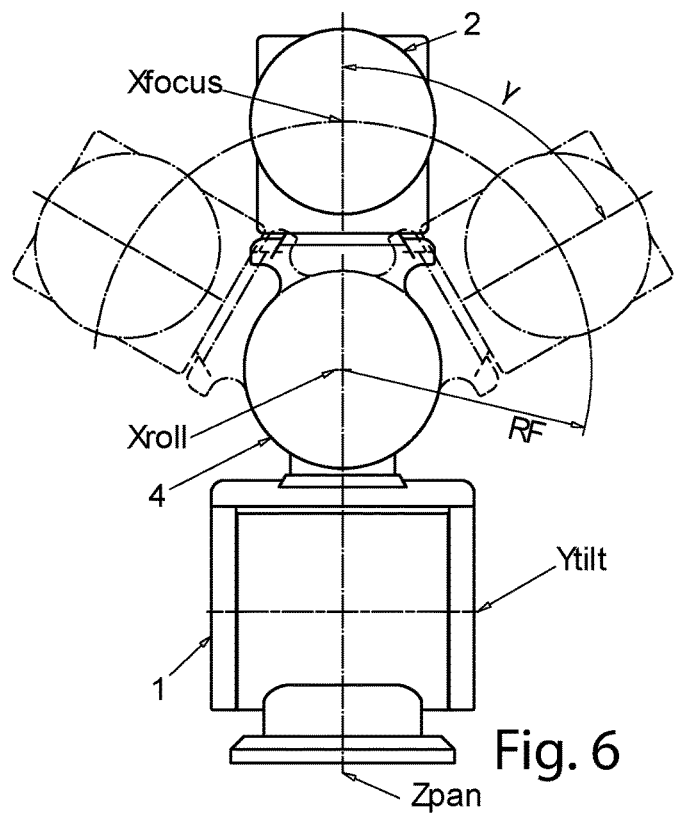
FIG. 6 shows a front view of the system of FIG. 4.
Figure 4:
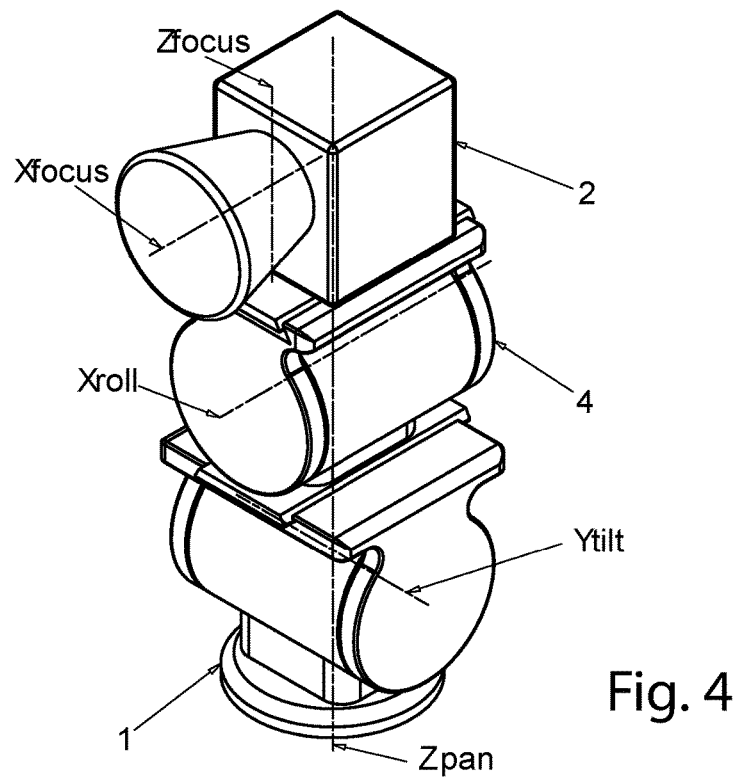
FIG. 4 schematically shows a perspective view of a first system according to the prior art which allow the limited rotation of the camera about a third axis.
Figure 8:
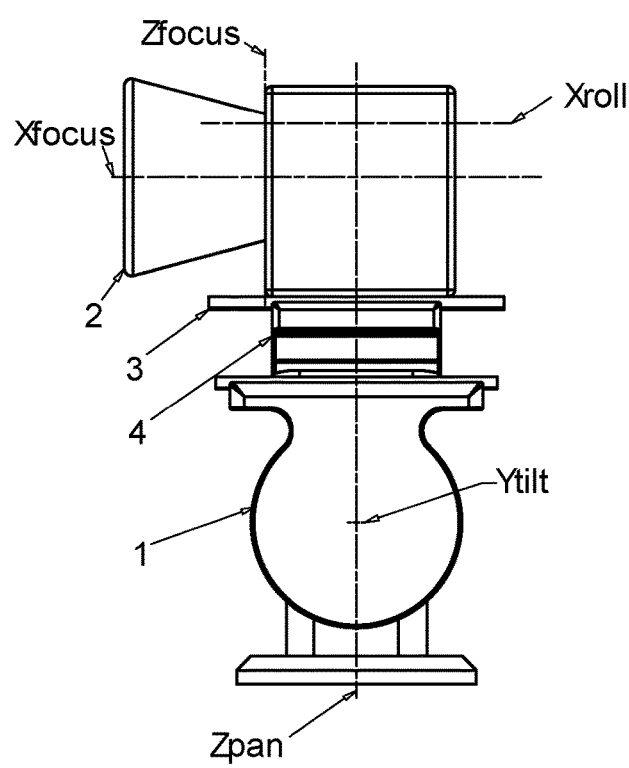
FIG. 8 shows a side view of the system of FIG. 7.
Figure 9:
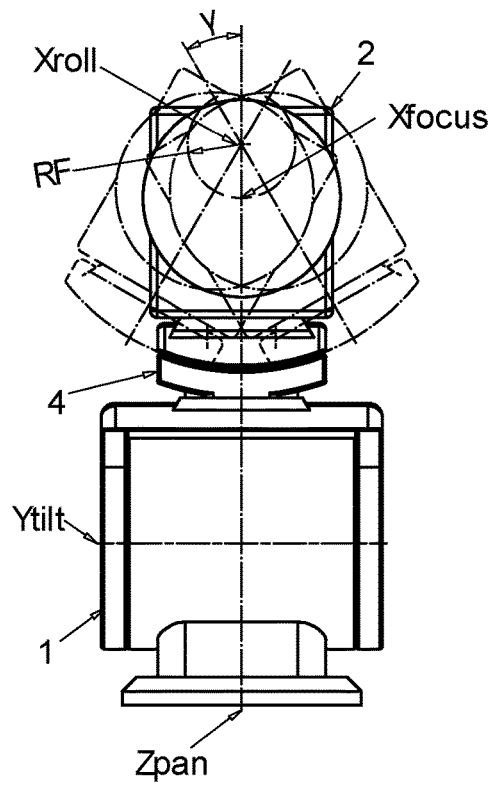
FIG. 9 shows a front view of the system of FIG. 7.
Figure 7:
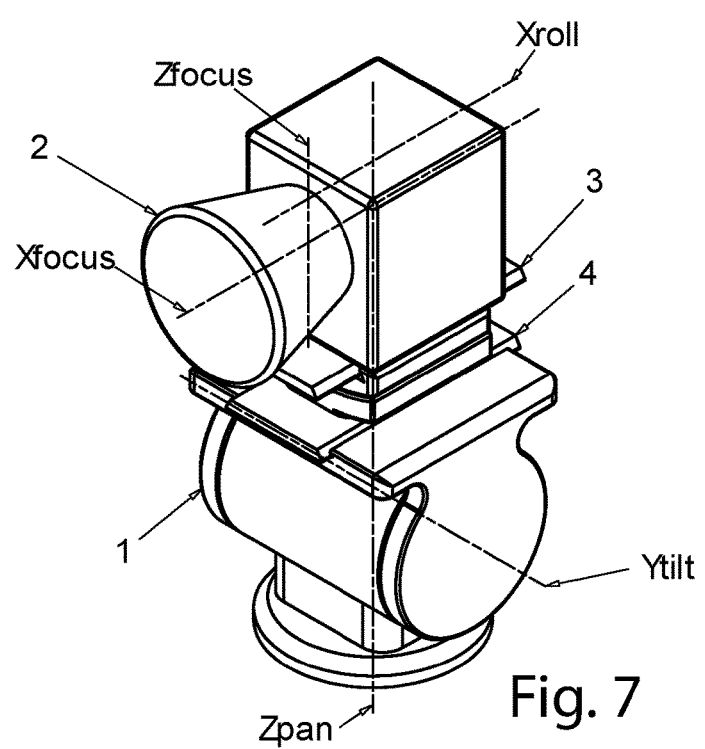
FIG. 7 schematically shows a perspective view of a second system according to the prior art which allow the limited rotation of the camera about a third axis.

The same reference numerals are use in FIGS. 10-19 for identifying the same elements of the previous FIGS. 1-9, relative to the prior art solutions.

Figure 10:
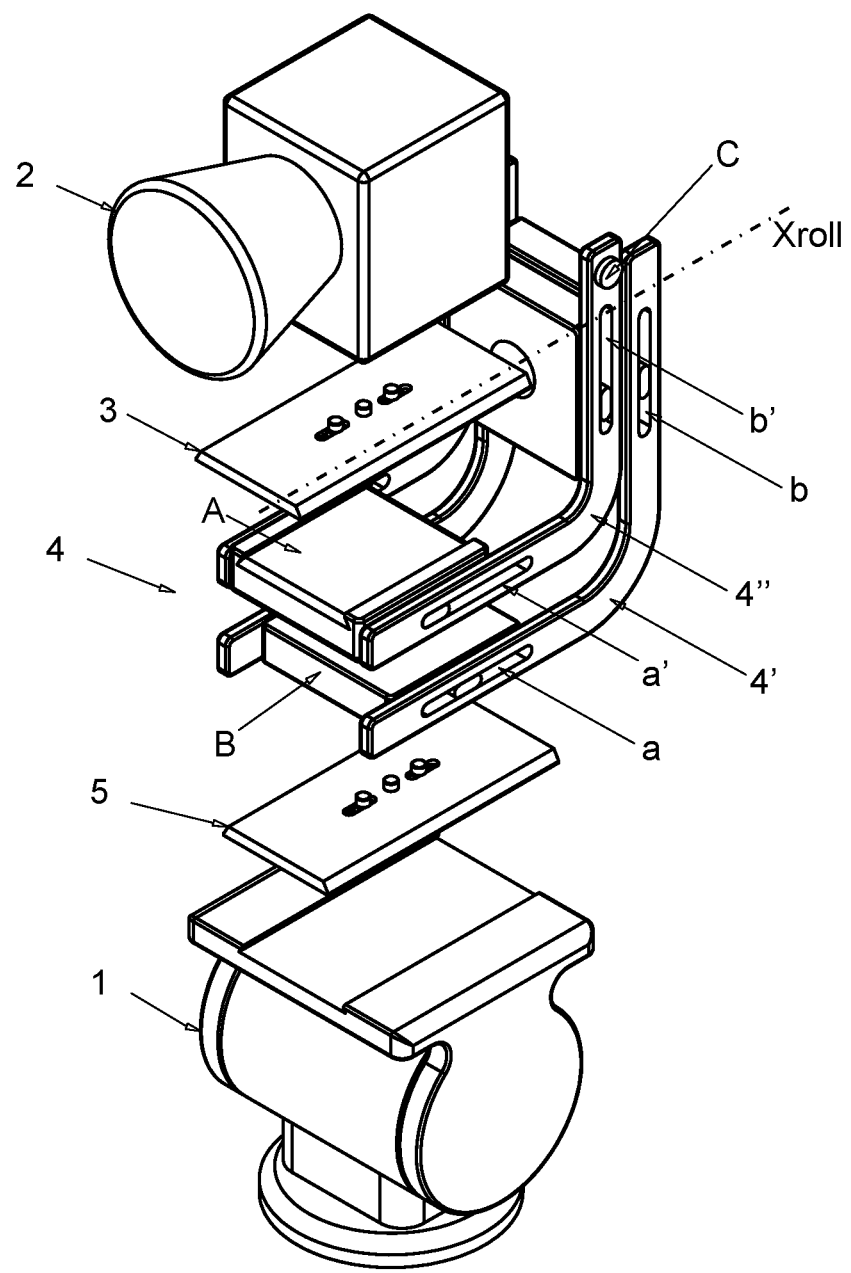
FIG. 10 shows an exploded perspective view of the system according to the invention.

As shown in particular in FIG. 10, the solution according to this invention comprises the introduction of a system, indicated generically with reference numeral 4, constrained to the head 1 by fixing means 5, which allows the camera 2 to be connected by means of a coupling plate 3 of the camera 2.

In this way, it is possible to rotate the camera 2 by an angle γ of 360° about the $X_{roll}$ axis, without the use of any counterbalancing means, with the possibility of assisting the movement with fluid dampening or motorization. Moreover, as mentioned, the possibility is guaranteed of taking a nodal shot about the Xroll axis, wherein the axis of rotation Xroll coincides exactly with the Xfocus axis of the optical centre of the camera. Said system 4 is characterized by two "L" shaped profiles 4' and 4", hinged at the Xroll axis, in such a way as to allow a complete 360° rotation γ of 4" relative to 4' about the Xroll axis.

It is clearly evident that the "L" shaped profiles can also adopt a different configuration, for example "U" shaped, without thereby departing from the scope of the inventive concept. What is necessary is that there is the possibility of adjustment on two substantially parallel axes.

For this purpose, the "L" shaped elements 4' and 4" have linear guides a and a' which allow the position of the camera 2 and the system 4 along the Xroll axis to be adjusted, in such a way as to allow the possibility of adjusting the position of the centre of gravity of the system, which is in this way balanced under rotations α about the Ytilt axis, and guides b and b' for adjusting the position of the camera 2 along the Zpan axis, in such a way as to allow the possibility of adjusting the position of the centre of gravity of the camera 2, balancing the system following rotations γ about the Xroll axis.

Moreover, the element 4' has an interface B for the coupling, with the fixing means 5, to the head 1.

On the other hand, the element 4" has an interface A which allows the fixing of the camera 2, by means of the plate 3, and of the elements C for the connection of any counterweights (not shown).

Figures 12, 13:
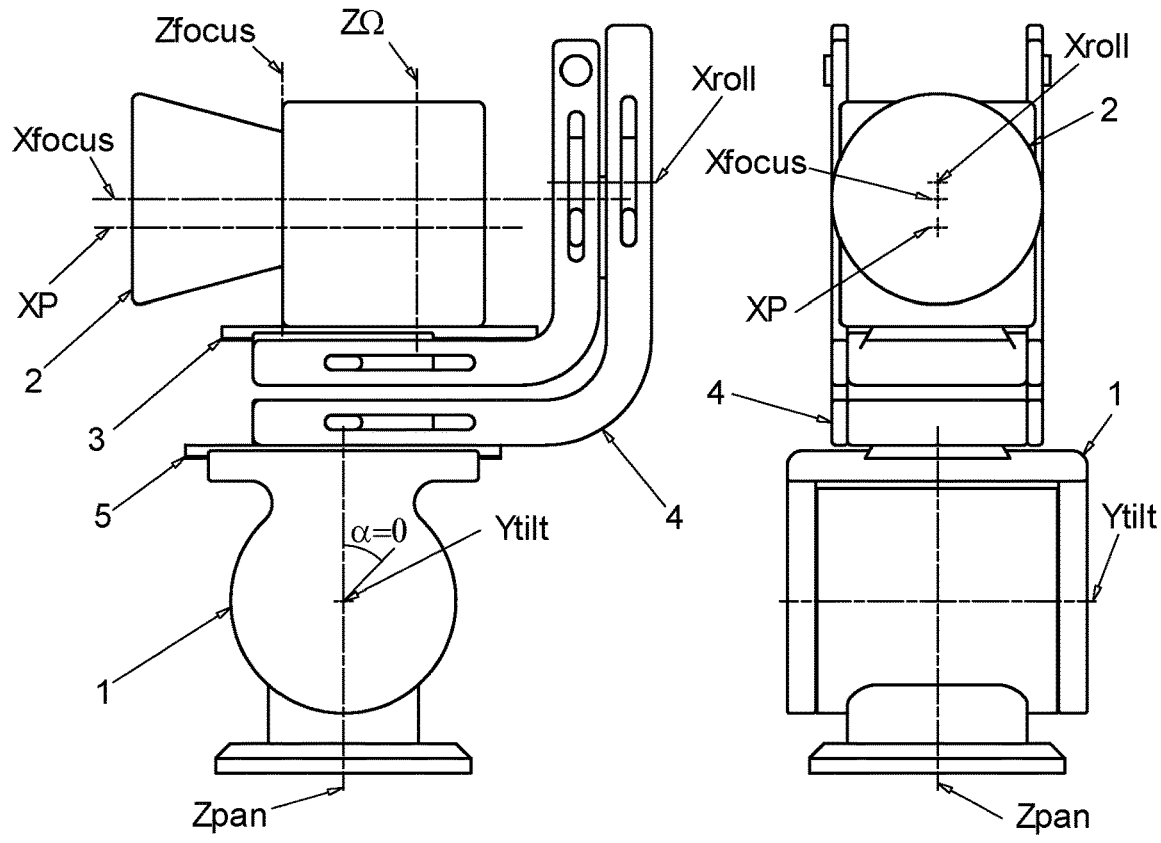
FIG. 12 shows a schematic side view of the system of FIG. 11.
FIG. 13 shows a front view of the system of FIG. 11.
Figure 11:
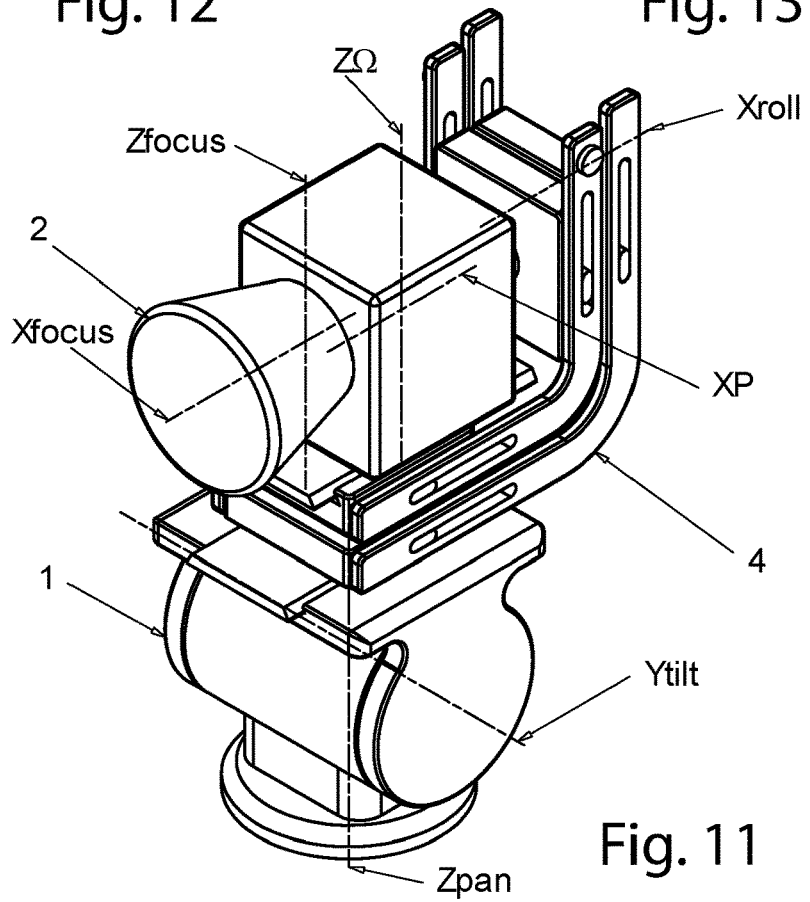
FIG. 11 shows a perspective view of the system of FIG. 10 according to a first configuration.

FIGS. 11-13 show how the system according to the invention can be provided on any supporting head 1 of a camera 2, which allows the homogeneous movement with rotation about the Zpan and Ytilt axes, and allows the camera 2, positioned on 4", to be rotated according to an angle γ about the Xroll axis.

The movement of the camera 2, thanks to the adjustments described in more detail below, allow a nodal shooting over an arc 360° without angular limitations.

Reference P indicates the system comprising "L" shaped plate 4", plate 3 for attaching camera, and camera 2; reference Ω indicates the system comprising fixing means 5, "total Dutch" system 4, plate 3 for attaching camera, and camera 2.

An Xroll axis is generally defined as an axis not coinciding with the XP axis of the centre of gravity P, in turn not coinciding with the Xfocus axis of the optical centre of the camera.

Similarly, there is a Zpan axis, for α=0, not coinciding with the ZΩ axis of the centre of gravity of Ω in turn not coinciding with the Zfocus axis of the optical centre of the camera.

By using the linear guides b and b' it is possible to adjust the system in such a way that the centre of gravity of P is in a position such that XP coincides with Xroll, making the system balanced under rotations γ about the Xroll axis.

By using the linear guides a and a' it is possible to adjust the system in such a way that the centre of gravity Ω for α=0 is in a position such that ZΩ coincides with Zpan, making the system balanced under rotations α about the Ytilt axis (carrying out the opportune adjustments on the counterbalancing means with which the head 1 is equipped).

Figures 15, 16:
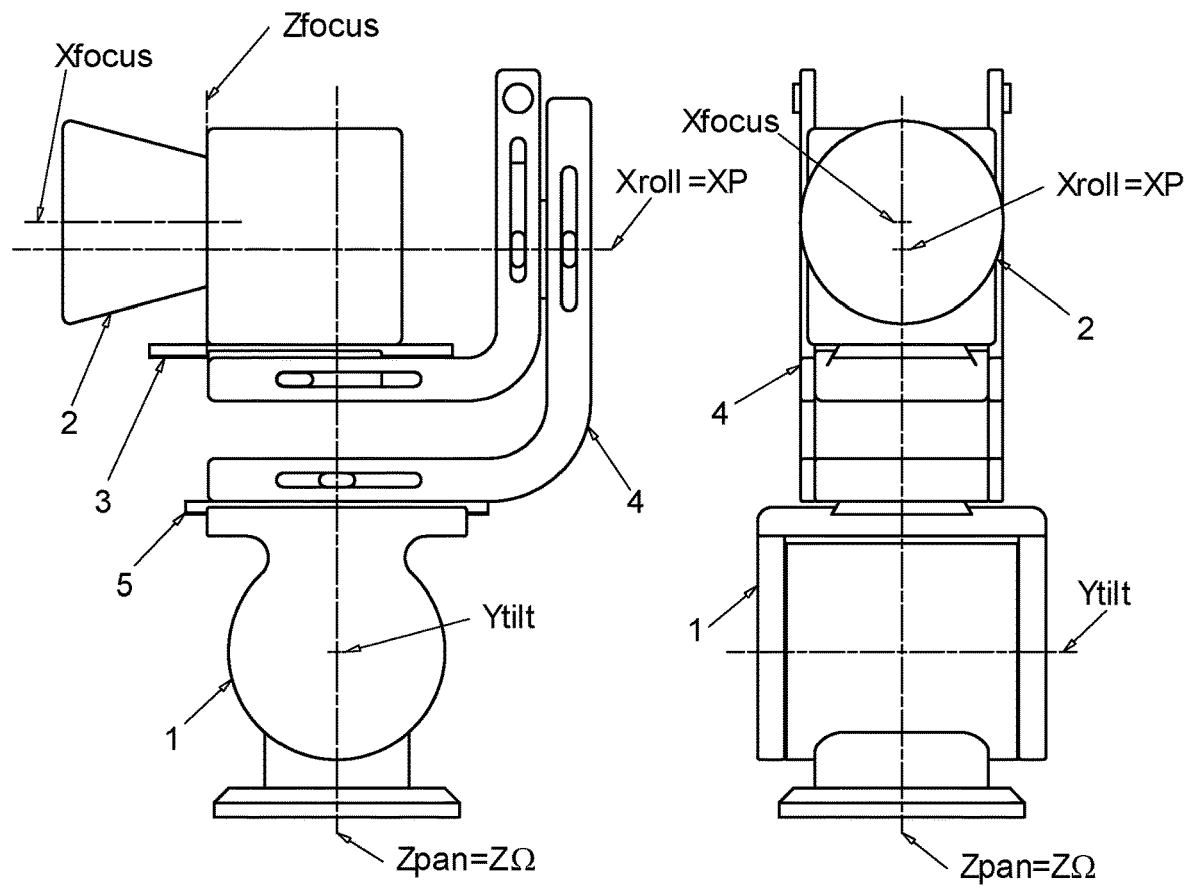
FIG. 15 shows a schematic side view of the system of FIG. 14.
FIG. 16 shows a front view of the system of FIG. 14.
Figure 14:
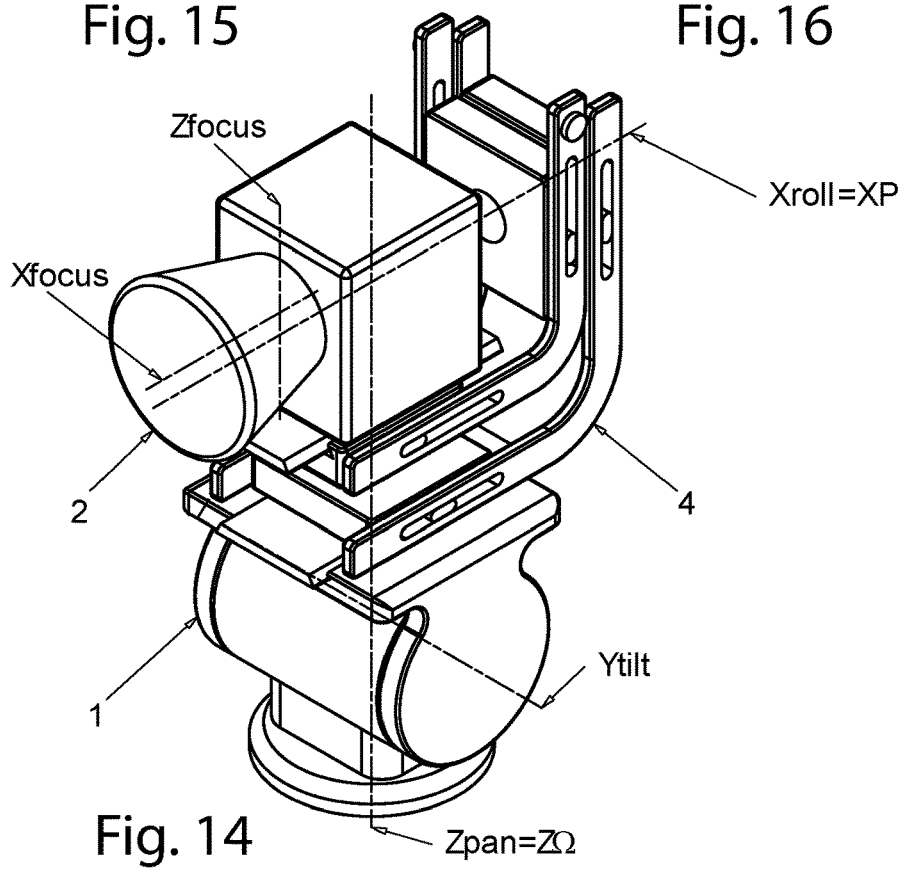
FIG. 14 shows a perspective view of the system of FIG. 10 according to a second configuration.

In the configuration illustrated in FIGS. 14-16, the system is perfectly balanced and allows a complete rotation β of 360° about the Zpan axis (without angular limitations), a rotation α of ±90° about the Ytilt axis and a complete rotation γ of 360° about the Xroll axis (without angular limitations).

In the case in which XP and ZΩ do not coincide with Xfocus and Zfocus it is possible to add opportune counterweights (not shown) at the element C of 4" in such a way that XP coincides with Xfocus and ZΩ coincides with Zfocus.

In the configuration illustrated in FIGS. 17-19, the system according to the invention is perfectly balanced and allows a complete rotation β of 360° about the Zpan axis (without angular limitations), a rotation α of ±90° about the Ytilt axis and a complete rotation γ of 360° about the Xroll axis (without angular limitations).

It is also possible to take a nodal shot about the Xroll axis, as it coincides with Xfocus which in turn coincides with XP.

Lastly, having fixed the angle of rotation α about Ytilt equal to zero (α=0), it is also possible to take a nodal shot about the Zpan axis as it coincides with Zfocus which in turn coincides with ZΩ.

From the above description it may be clearly inferred how the solution according to this invention resolves all the problems which characterize the prior art solutions, and the following advantages are achieved: the possibility of carrying out a rotation about a third axis-camera Xroll by the introduction of a system which needs neither a counterbalancing system (significantly lowering the centre of gravity of the payload) nor a system which mechanically allows the rotation (for example, rack and worm screw);

a complete rotation γ of 360° about the Xroll axis without any angular limitation;

possibility of taking a nodal shot about the Xroll axis;

for α=0 (angle of rotation about the Ytilt axis), possibility of taking a nodal shot about the Zpan axis;

possibility of making the adjustments through the micrometric linear guides a, a', b and b' for an easy and precise setting of the system;

possibility of acting on the third Xroll axis through a manual (handle or lever) or motorised actuation;

possibility of making the movement on the third Xroll axis assisted by fluid dampening means with continuous or step-like variability.

The present invention is described by way of example only, without limiting the scope of application, according to its preferred embodiments, but it shall be understood that the invention may be modified and/or adapted by an expert in the field without thereby departing from the scope of the inventive concept, as defined in the claims herein.

The invention claimed is:

1. A system for supporting a camera, said camera being fixed on an articulated head permitting smooth movement along Zpan and ytilt axes, said articulated head being provided with dampening variable fluid means and counterbalancing means, to annul the weight of the camera when rotated about the Ytilt axis, said system being provided with a structure for rotation of the camera around a third $X_{roll}$ axis, said structure being interposed between said head, above the same, and said camera, below the same, and comprising, from the articulated head to the camera, fixing means to the articulated head, a first and a second profiled elements, hinged in correspondence of the $X_{roll}$ axis, so as to allow a complete 360° rotation γ of said second profiled element with respect to said first profiled element about the $X_{roll}$ axis, having at least a first arm substantially parallel with respect to a support plane of the system and a second arm substantially perpendicular with respect to said first arm, said first profiled element being coupled to said fixing means to the articulated head, said first and second profiled elements being provided with means for mutual adjustment and the camera along two planes parallel with respect to said first and second arm, a machine plate, coupled above said second profiled member, and supporting above said camera, the profiled element having an interface for coupling with the head, by said fixing means, and the profiled element having an interface allowing the fixing of the camera, by the plate.

2. System for supporting a camera according to claim 1, wherein there are provided, on said second arm of said second profiled element, means for fixing counterbalancing weights, necessary for making a nodal shooting.

3. System for supporting a camera according to claim 1, wherein said first and second profiled elements are "L" shaped elements.

4. System for supporting a camera according to claim 1, wherein said fixing means between the head and the first profiled element are comprised of a plate.

5. System for supporting a camera according to claim 1, wherein said means for the mutual adjustment of the first and the second profiled elements and the camera along two planes parallel with respect to said first and second arms of the respective first and second profiled elements are linear guides.

6. System for supporting a camera according to claim 5, wherein said linear guides are comprised of slots, within which slide elements projecting from the respective plates.

\* \* \* \* \*